United States Patent [19]

Nagamatsu

[11] Patent Number: 5,315,697
[45] Date of Patent: May 24, 1994

[54] METHOD FOR LINKING PROGRAM EXECUTION STATUS INFORMATION

[75] Inventor: Yuji Nagamatsu, Sagamihara, Japan

[73] Assignee: Hitachi, Ltd., Tokyo, Japan

[21] Appl. No.: 661,411

[22] Filed: Feb. 26, 1991

[30] Foreign Application Priority Data

Mar. 2, 1990 [JP] Japan .................................. 2-052214

[51] Int. Cl.$^5$ .............................................. G06F 15/62
[52] U.S. Cl. ..................................... 395/155; 395/161
[58] Field of Search ............... 395/155, 500, 920, 161; 371/19

[56] References Cited

U.S. PATENT DOCUMENTS

| | | | |
|---|---|---|---|
| 4,872,167 | 10/1989 | Maezawa et al. | 371/19 |
| 4,943,968 | 7/1990 | Hirose et al. | 371/19 |
| 5,021,948 | 6/1991 | Nakayama et al. | 364/200 |
| 5,124,989 | 6/1992 | Padawer et al. | 071/19 |
| 5,142,679 | 8/1992 | Owaki et al. | 395/700 |
| 5,157,782 | 10/1992 | Tuttle et al. | 395/575 |
| 5,165,036 | 11/1992 | Migata et al. | 395/800 |

OTHER PUBLICATIONS

Shah et al., "Network Simulator (NTSIM) A Benchmark Prototype Network Architecture", 45th IEE Region 10 International Conference on Information Technologies (1989) pp. 1093–1098.

Munro, "Ecstasy-A Control System CAD Environment", International Conference on Control '88 (1988), pp. 76–80.

Jerard et al., "Methods for Detecting Errors in Numerically Controlled Machining of Sculptured Surfaces", IEEE Computer Graphics and Applications vol. 9, No. 1 (1989), pp. 26–39.

Krogh et al., "Automated Generation and Evaluation of Control Programs for Discrete Manufacturing Processes", 1988 International Conference on Computer Integrated Manufacturing (1988) pp. 92–99.

"Hypertext and Its Application to Programming Environment", Information Processing, vol. 30, No. 4, 1989, pp. 406–413.

Primary Examiner—Gary V. Harkcom
Assistant Examiner—N. Kenneth Burraston
Attorney, Agent, or Firm—Fay, Sharpe, Beall, Fagan, Minnich & McKee

[57] ABSTRACT

A method for automatically linking program execution status information during the execution of a program to display the execution status information of the program by a multi-window display having a plurality of sectioned areas for use in the development of the software program. In the method for displaying the program execution status information, text data of a program having a plurality of instruction statements sequentially executed in the order of line numbers is prestored, and the following steps are carried out in the course of the execution of the program: storing image information which is continuously obtained by recording output screen image and interaction images between a computer and an operator as the program is executed, together with recorded image data identification numbers determined in accordance with a predetermined rule; storing execution history information inputted by an operator or generated in the course of the execution of the program, together with history numbers assigned in a predetermined sequence; and correlatively storing in a table the recorded image data identification numbers, the line numbers of the program corresponding to the recorded image information having the recorded image data identification number assigned thereto, and the history numbers assigned to the execution history information corresponding to the programs designated by the line numbers.

3 Claims, 9 Drawing Sheets

F I G. 1
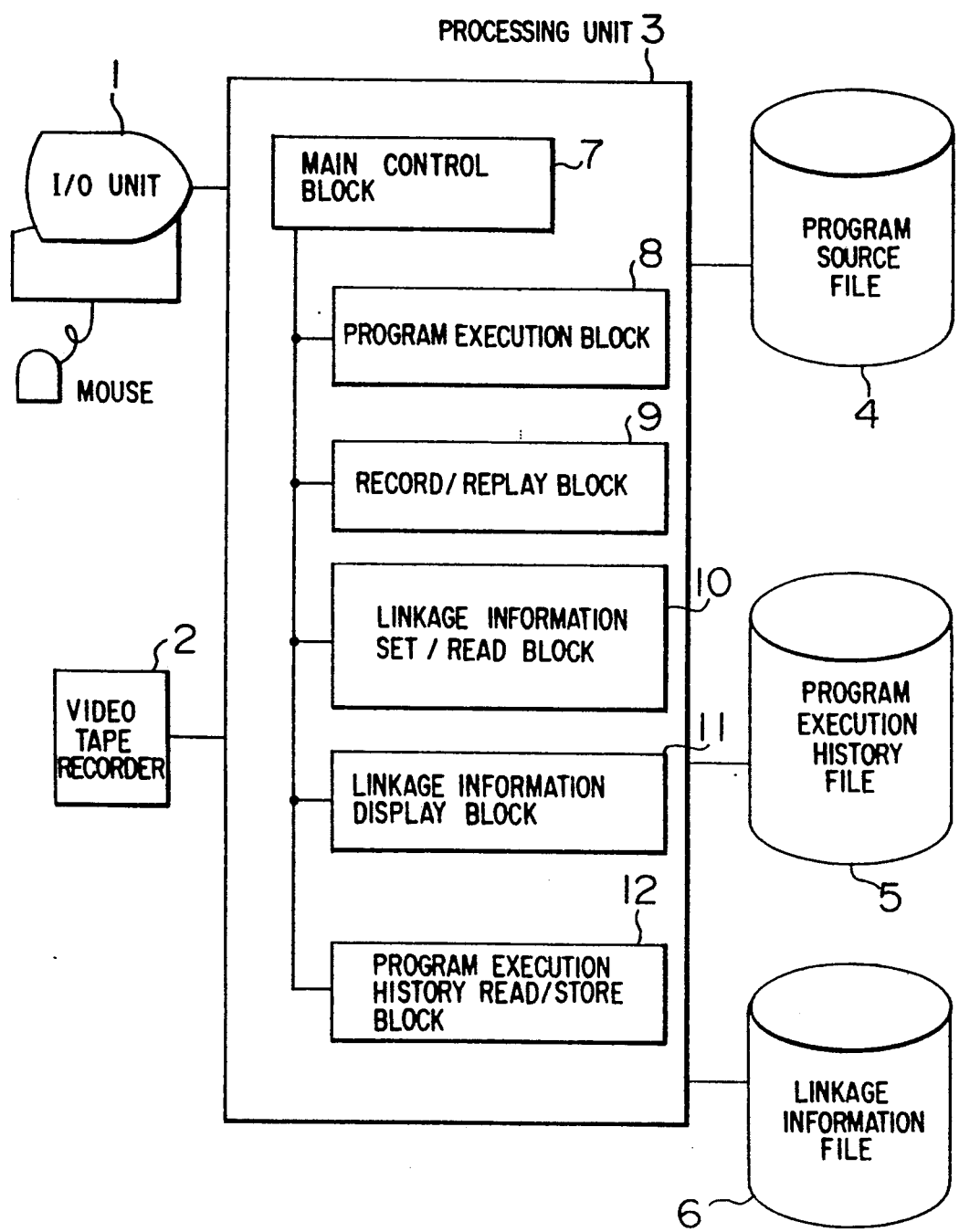

FIG. 7

(a) OBJECT LINKAGE INFORMATION TABLE

| VIDEO TAPE ID (PROGRAM EXECUTION IMAGE) | PROGRAM ID | PROGRAM EXECUTION HISTORY ID | IMAGE DATA ID | VOICE DATA ID | VIDEO TAPE ID (ANIMATION) | VIDEO TAPE ID (PERIPHERAL) | OBJECT-ELEMENT LINKAGE INFORMATION TABLE ID |
|---|---|---|---|---|---|---|---|
| 117 | 118 | 119 | 120 | 121 | 122 | 123 | 124 |

(b) OBJECT-ELEMENT LINKAGE INFORMATION TABLE

| POINT MARKER (PROGRAM EXECUTION IMAGE) | PROGRAM (AREA) | PROGRAM EXECUTION HISTORY (AREA) | IMAGE DATA (AREA) | POINT MARKER (VOICE DATA) | POINT MARKER (ANIMATION) | POINT MARKER (PERIPHERAL) |
|---|---|---|---|---|---|---|
| 127 | 128 | 129 | 130 | 131 | 132 | 133 |

METHOD FOR LINKING PROGRAM EXECUTION STATUS INFORMATION

BACKGROUND OF THE INVENTION

The present invention relates to a method for automatically linking program execution status information to display program execution status information by using a multi-window display sectioned into a plurality of areas for use in the development of a software program. More particularly, the invention relates to a method for linking, text data, image information which is continuously obtained by recording at least one of an output screen image generated by the execution of the program, a moving image of a machine controlled by the program and an operation image of an operator in the course of execution of the program, and history information which is generated in the course of execution of the program, during the execution of the program.

In a related, art system, in order to improve efficiency of the maintenance of a software program, any portion of a source text portion of the program and a document portion of a specification corresponding to the source text portion is manually linked, and the document portion of the specification corresponding to the source text portion is parallelly displayed on an operator's instruction while the operator watches the program source text on a display screen.

The above related art technique is disclosed in "Hypertext and Its Application to Programming Environment" INFORMATION PROCESSING, Vol. 30, No. 4 (1989, 4) pages 406–413.

In the above related art, the linking of the program source text portion and the document portion of the specification is accomplished manually. Accordingly, the linking work is troublesome and lacks practicability.

In the related art, when a modified area of the program is to be detected, when the program is to be maintained or when an execution status of the program is to be checked, the program is actually run and any error is detected by manual collation with a specification, information is logged to collate it with the specification, or the execution of the program is stopped at a desired point to check the status at the stopped point.

In the related art, in order to determine a function and a feature of an existing program, there is no other way than imaging them in the human brain by viewing a specification. As a result, only a vague image can be determined. Accordingly, when the program is to be reutilized to support the development of another program, the support is not sufficient because the function and feature of the existing program have not been fully determined. In the related art, in order to communicate test information and claims of a user to a program developer who is not on site, a memorandum which describes the situation or oral communication is used. This, however cannot fully communicate the situation to the developer. In the related art, when an execution status of a program is to be examined in detail at a desired time point, the examination takes a long time and the status cannot be fully appreciated if the synchronization between a recorded display screen and the program is not perfect.

SUMMARY OF THE INVENTION

It is an object of the present invention to provide a method for linking program execution status information capable of automatically correlating a program and program execution status information.

In order to achieve the above object, the method for linking the program execution status information of the present invention comprises the steps of:

(A) storing text data of a program including a plurality of instruction statements executed in the order of line number, (B) storing image information which is continuously obtained by recording at least one of output screen images and interaction images between a computer and an operator as the program is executed or, more particularly, an output screen image generated by the execution of the program, a moving image of a machine controlled by the program and an operation image of an operator in the course of the execution of the program, together with recorded image data identification numbers determined in accordance with a predetermined rule;

(C) storing execution history information, inputted by an operator or generated in the course of the execution of the program, together with history numbers assigned in a predetermined sequence; and (D) correlatively storing in a table the recorded image data identification numbers, the line numbers of the program corresponding to the recorded image information having the recorded image data identification numbers assigned thereto and the history numbers assigned to the execution history information corresponding to the programs designated by the line numbers.

Specifically, in accordance with the present invention, an image which shows the execution status of the program is recorded, and linkage information tables (an object linkage information table and an object element linkage information table) for registering and managing the relationship of various information such as the program source text and the execution history are provided. The object linkage information table contains store locations of the linked data, and the object element linkage information table contains a relationship between the data elements linked by the object linkage information table. When the image is to be recorded, pointer information (point markers) to point the records of the linkage information table is set up.

First, the program is executed and the image which shows the execution status of the program is recorded by an image recording unit. An initial value is set for the point marker for the information to be recorded, the initial value of the point marker is set up in a first record of the object element linkage information table, and the start line of the program source text file and the start line of the program execution history information text are set up.

During the execution of the program, the point marker is incremented by one for each unit of time or information. It is set up in the object element linkage information table, and the line number of the program source text which is being executed for the record and the line number of the current history information text are set up. Those processes are repeated until the execution of the program is terminated.

When the recorded image is to be replayed, the value of the point marker recorded on the replayed image is read and various data are displayed on the multi-window display by using the line number of the program source text corresponding to the replayed image and the line number of the history information text stored in the linkage information tables.

In this manner, the information which shows the execution status is automatically recorded in synchronism with the execution of the program and they are automatically linked. Accordingly, no manual work is required. By replaying the recorded image, the execution history of the program relating to the relayed information is automatically presented to the user while the user checks the execution status of the program. Accordingly, a modification location of the program can be simply detected and the maintenance and test of the program can be efficiently done. By displaying an operation image (method) of an existing program or an operation image of a hardware controlled by the program or peripheral people or articles, the function and feature of the existing program can be rapidly grasped. When the program is executed, user-designated data (test information and claims) and the information which indicates the execution status of the program are correlatively registered. Accordingly, a person who was not on site can read the data which the user registered by replaying the information indicating the execution status of the program to efficiently conduct the maintenance and test of the program. Further, the information which indicates the execution status of the program as well as various information including, text information, such as related execution history information, image data, voice data, graphic representation of the execution status of the program and animation are displayed. Therefore, the maintenance and test of the program can be efficiently accomplished. Further, where an interpreter in a fourth generation language or an executable program specification such as spread sheet or database management program is executed, the information which indicates the execution status as well as various data including the text information, image data, voice data, graphic representation of the execution status and animation such as the related execution history information are correlatively displayed so that the software can be efficiently developed.

The other objects and features of the present invention will become understood from the following description with reference to the accompanying drawings.

BRIEF DESCRIPTION OF THE DRAWINGS

FIG. 1 shows a block diagram of a program execution status display system in accordance with a first embodiment of the present invention;

FIG. 7 shows a content of a linkage information table shown in FIG. 6; and

DESCRIPTION OF THE PREFERRED EMBODIMENTS

Figure 2:
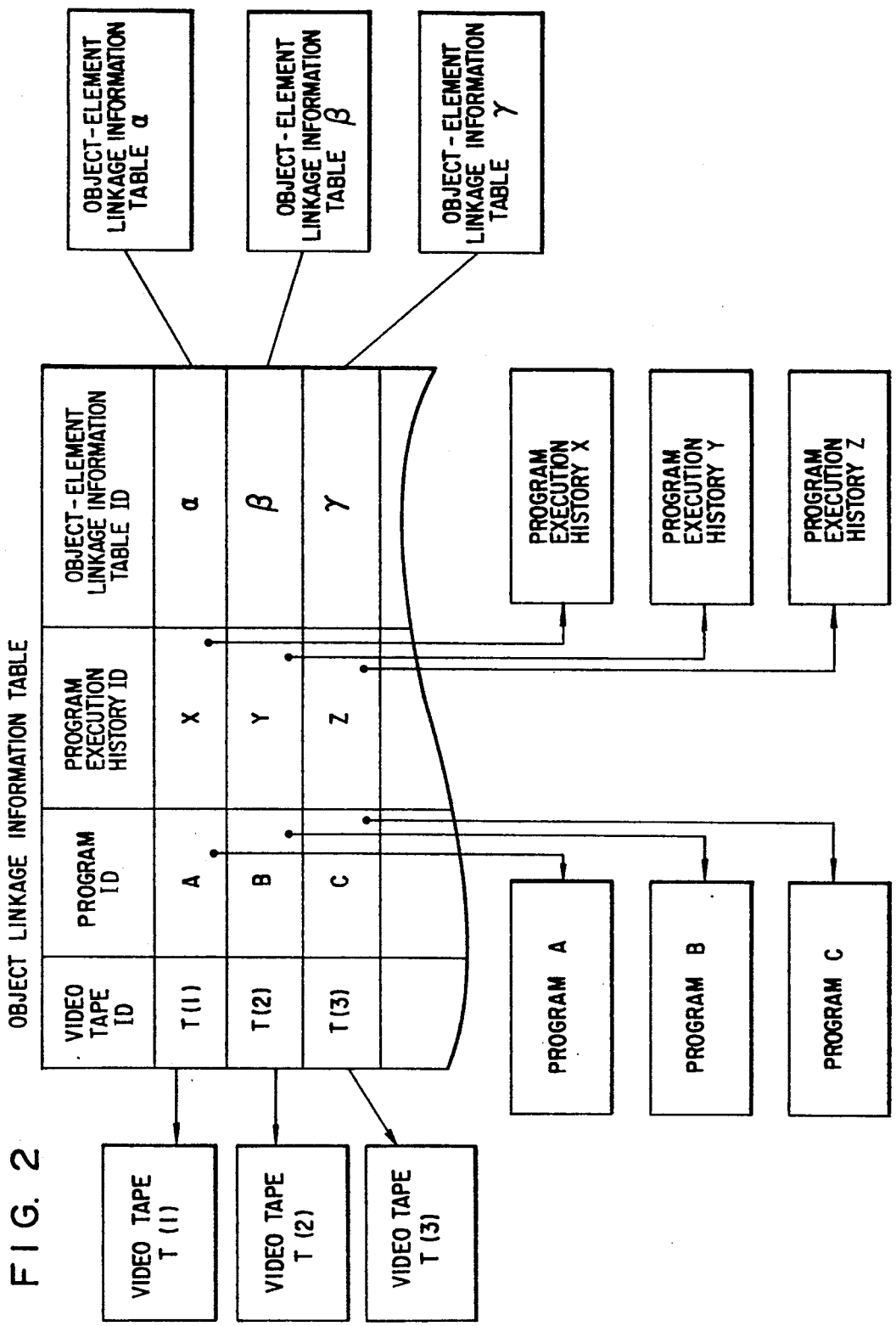
FIG. 2 shows a content and a relation of an object linkage information table shown in FIG. 1.

FIG. 1 shows a block diagram of a computer system which has a program execution status display function in accordance with a first embodiment of the present invention.

In FIG. 1, numeral 1 denotes a terminal device having a display, a keyboard and a mouse, numeral 2 denotes a VTR (video tape recorder) which records and replays an image, numeral 3 denotes a processing unit which controls the recording and replaying of the image, sets up and displays the linkage information and manages the history information, of the present invention, numeral 4 denotes a program file which contains a source text of a generated program, numeral 5 denotes a program execution history file which contains the execution history of the program, and numeral 6 denotes a linkage information file which contains linkage information between the recorded images and the data including the program source text, and the execution history.

The processing unit 3 comprises a program execution block 8 which controls a program in a program file which the user designates, a record/replay block 9 for recording and replaying a program execution image by the VTR 2, a linkage information set/read block 10 which sets up a tape marker or a point marker on the recorded image and reads the tape marker or point marker on the image when the image is replayed, a linkage information display block 11 which displays related information in accordance with the tape marker or point marker, a history information management block which manages the execution history of the program, registers the information in the program execution history file and reads the registered information, and a main control block 7 which controls the overall functional blocks. The functional blocks 7 to 12 are program modules which perform their functions.

The linkage information file 6 contains linkage information tables, which include an object linkage information table and an object element linkage information table. Those linkage information tables manage the linkage information between the recorded images and the program source text and the execution history.

The object linkage information table contains a location (an address and an identifier) at which data of an object to be linked such as VTR, program or history information is stored. The object element linkage information table contains the linkage between the elements or partial areas such as on-screen information of the VTR or a statement of the program, of the object data linked by the object linkage information table.

Figure 3:
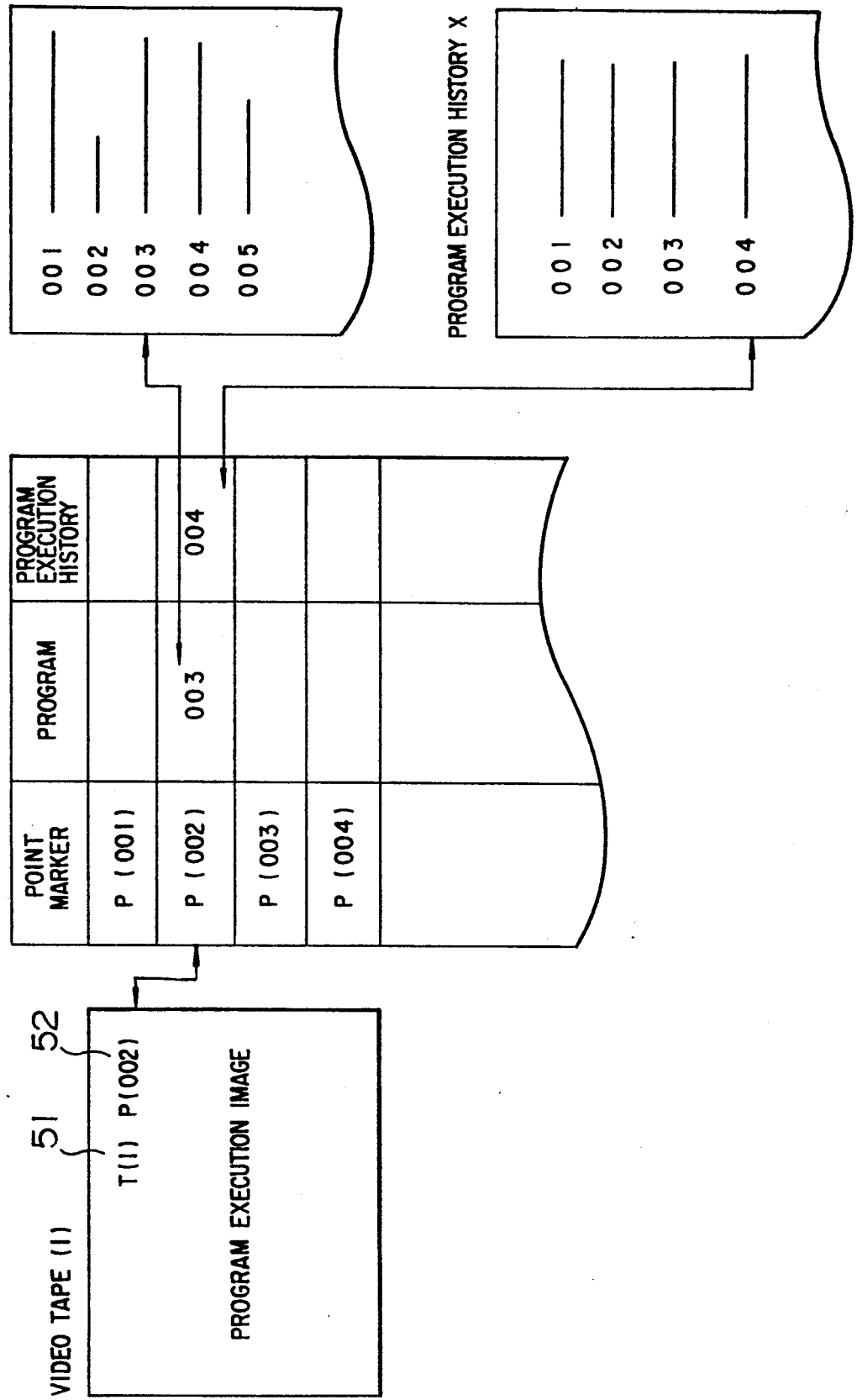
FIG. 3 shows a content and a relation of an object element linkage information table shown in FIG. 1.

FIG. 2 shows an example of the object linkage information table in the present invention, and FIG. 3 shows an example of the object element linkage information table.

As shown in FIG. 2, the object linkage information table contains identifiers (tape ID) of a video tape on which the execution image has been recorded, names (program ID) of the executed program stored in the file 4, names (history information ID) of the execution history information stored in the file 5, and pointers (object element linkage information table ID) to the object element linkage information table.

In the present example, T(1), T(2), T(3),—are recorded as the tape ID, program A, program B, program C,—are recorded as the program ID, history information X, history information Y, history information Z,—are recorded as the history information ID, and object element linkage table α, object element linkage information table β, object element linkage information table γ,—are recorded as the object element linkage information table ID.

As shown in FIG. 3, the object element linkage information table contains identifiers (point markers) of the video tapes on which the execution images have been recorded, line numbers of the program source text related to the executed program, and line numbers of the execution history information text. The identifier of the video tape on which the execution image has been recorded is generated by setting an indicia (tape marker) 51 shown in FIG. 3 on the image to be recorded in order to identify it. The tape marker is represented by T (numeric value) which is set in accordance with the tape on which the execution image of the program has been recorded. The value of the tape marker is set by the linkage information set/read block 10 shown in FIG. 1. The value which is not in the object linkage information table is automatically set. It is different from the pre-registered value of the tape marker.

When the image is to be recorded, an indicia (point marker) 52 shown in FIG. 3 is set on the screen to be recorded and it is recorded on the object element linkage information table. The value of the point marker designates one record of the object element linkage information table. The point marker is represented by P (numeric value).

In the object element linkage information table shown in FIG. 3, P (002) is recorded as the point marker, a line number 003 of a source text of a program A is recorded as the line number of the source text of the related program, and a line number 004 of history information X is recorded as the line number of the execution history information text, for each recorded image.

By utilizing the object linkage information table in this manner, an area of other related data may be specified out of any one of data including the recorded image, the program source text and the history information text.

Figure 4:
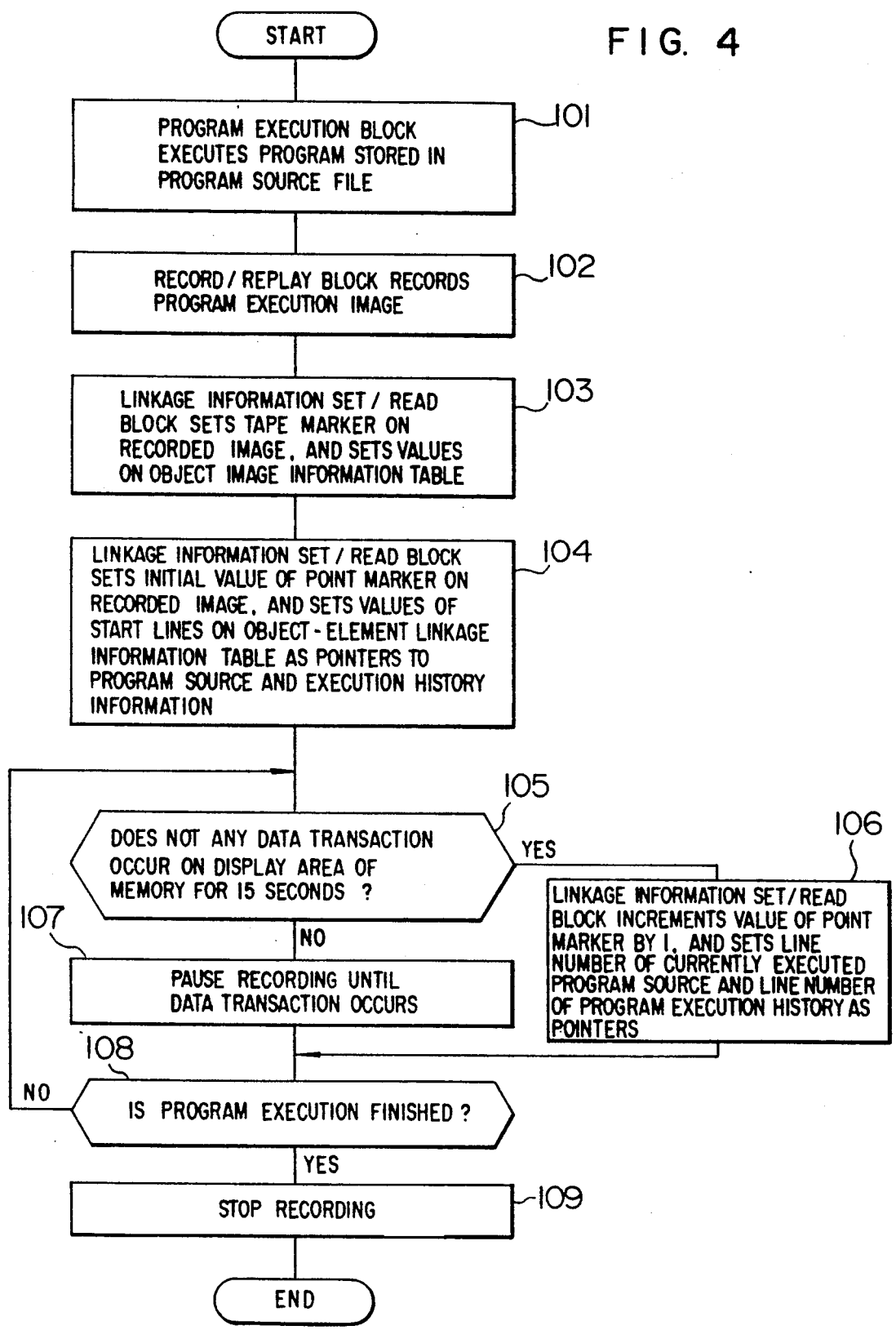
FIG. 4 shows a flow chart of a process of the present invention.

FIG. 4 shows a process flow chart which the system of FIG. 1 executes.

The program execution block 8 of FIG. 1 executes the program registered in the program file 4 which the user has specified (step 101). Then, the record/replay block 9 records the execution image of the program by the VTR 2(step 102). The linkage information set/read block 10 sets the values of the items in the object linkage information table of FIG. 2. It automatically sets the value of the tape marker to one which is different from the pre-registered tape marker values, sets the name of program and the name of execution history information, newly prepares an object element linkage information table, and sets the identifier (the pointer to the table) of the table in the object linkage information table. The value of the tape marker on the recorded image is set to the same value as that of the object linkage information table (step 103). The linkage information set/read block 10 of FIG. 1 then sets an initial value (for example, 1) as the value of the point marker on the recorded image. The same value of the point marker is continuously set on the recorded image unless it is updated (step 106). The initial value of the point marker is set in the first record of the previously prepared object element linkage information table, and the start line of the program source text file and the start line of the program execution history information text are set (step 104).

In the present invention, the recorded image is updated when a change occurs in the operation of the program in order to prevent useless run of the image. The change in the operation is detected by checking whether data has been inputted to or outputted from an image display area of a memory. Where there is no input or output of the data to or from the area, the recording is temporarily stopped until the data is inputted or outputted (steps 105 and 107). The linkage information set/read block 10 of FIG. 1 watches the input/output of the data to or from the image display area of the computer memory during the execution of the program, and if the input/output of the data is detected, the existing value plus one is set as the point marker on the recorded image. This point marker value is set into the object element information table, and the line number of the program source text under execution and the line number of the history information text registered in the program execution history file 5 by the history information management block 12 of FIG. 1 are set (steps 105 and 106). The above operation is repeated until the execution of the program is terminated (steps 108 and 109).

In another embodiment, instead of the steps 105, 106 and 107 of FIG. 4, the existing value plus one is set as the point marker on the recorded image for each unit of time (for example, one second) or unit of image (one image) during the execution of the program so that the value may be updated without the change in the image. Namely, the point marker is updated for each second or each image, the value of the point marker is set in the object element linkage information table, and the line number of the source text of the program which is being executed and the line number of the history information text which is being recorded in the program execution history file 5 by the history information management block 12 are set for the record (line).

Figure 5:
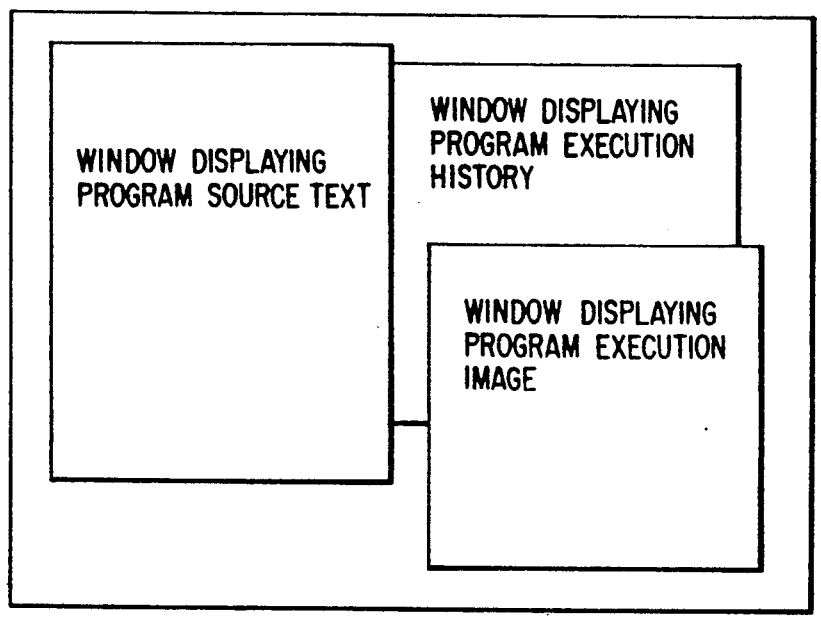
FIG. 5 shows a replayed image in the present invention.

FIG. 5 shows a multi-window image screen controlled by the linkage information display block of FIG. 1.

When the recorded image is replayed, the linkage information set/read block 10 of FIG. 1 reads the value of the point marker recorded on the replayed image to detect the line number of the program source text corresponding to the replayed image and the line number of the history information text based on the linkage information table.

In order to display the correlation between the replayed image and the data, the linkage information display block 11 of FIG. 1 may display the replayed image (execution image) in one window on a multi-window image screen as shown in FIG. 5 and the user may pause it at any point, and the line of the related text may be displayed in another window in a different color or the color of the related portion may be changed in accordance with the movement in the replayed image. In the present example, the program source text related to the replayed image and the execution history text are displayed in different colors. As a matter of course, the image replaying includes various operations such as fast forward, fast rewind, still and slow.

In this manner, the user can immediately detect the related portions of the program source text and the history information while watching the replayed image, that is, the program execution image. Further, since the data relating to the recorded information such as the execution area of the program source text and the pointer (point marker) to the related portion of the history information are recorded, the related data can be accessed based on the linkage information recorded in the replayed information when the recorded information is replayed.

In the present embodiment, the VTR and the video camera are used as the image recorder although other equipment which has a recording and replaying function such as an optical disk drive, an 8 m/m video or an IC memory may be used in the present invention.

Further, while the VTR and the video camera are used to record and replay the image, voice may also be recorded and replayed when the image is recorded and replayed because the existing VTR or video camera has a function of recording and replaying both image and voice.

In a second embodiment of the present invention, an interactive operation with the replayed image may be attained.

When data is entered from a keyboard to the image of the execution program, the execution status may change. When various execution status are to be checked, it is necessary to execute the program with various values of the program parameters.

In the above embodiment, the program execution history information related to the execution recorded image contains the execution line number of the program and all data which the program handles at that moment.

If the user pauses the replayed image at a desired point while the recorded image is replayed, the corresponding execution history information is searched by using the linkage information table based on the value of the point marker assigned to the replayed image, and the execution of the program is started from the execution line number of the program recorded in the retrieved information.

The execution of the program is started after the values of all data which are handled by the current program recorded in the execution history information have been set. Where the interactive operation with the user is included in the program, an interactive operation which is different from that of the replayed image is carried out in the manner described above when the execution of the program is resumed, and different data may be set to get the execution status of a different program. Further, the execution status thus acquired and the execution status of the replayed image may be compared and analyzed.

The program may be run fast up to a desired point to generally grasp the program execution status up to that point, and the program may be actually run from that point so that the execution status which is different from that of the replayed image can be checked after that point.

Figure 6:
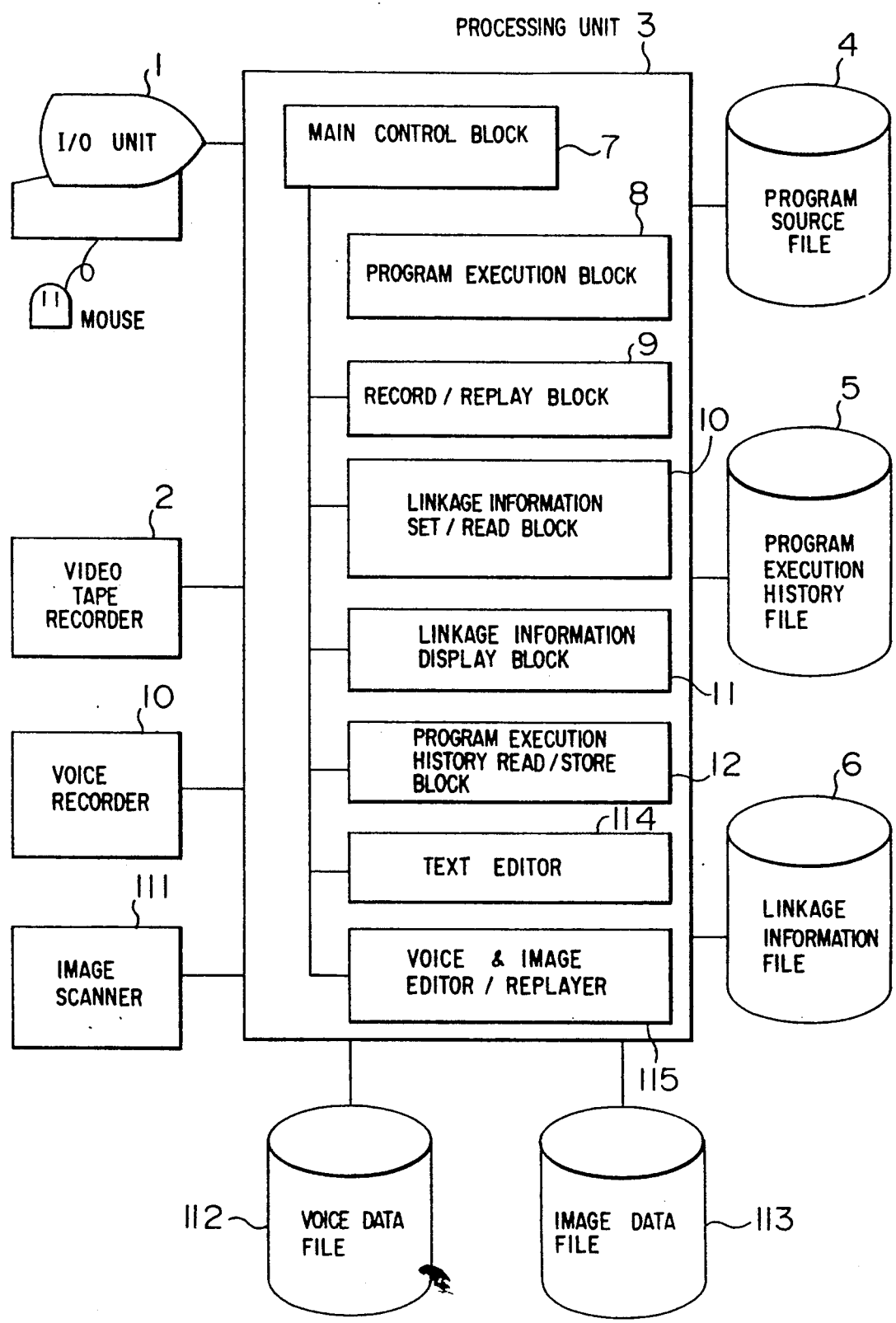
FIG. 6 shows a block diagram of a program execution status display system in accordance with a third embodiment of the present invention.

FIG. 6 shows a block diagram of a program execution status display system in accordance with a third embodiment of the present invention.

In the embodiment of FIG. 6, the user interrupts the program at a desired point and correlates the data which the user has registered such as image, voice or text to the program source text, the execution image and the history information.

The embodiment of FIG. 6 comprises, in addition to the system configuration of FIG. 1, a voice recorder 110 which records and replays voice of an operator, an image scanner 111 which scans the image from the VTR 2, a voice/image editor/replayer 115 which edits and replays the recorded voice and the scanned image data, a voice data file 112 which stores the information replayed by the voice recorder, and a text editor 114 which prepares operator's comments and claims as a text and edits it.

FIG. 7 shows information stored in the object linkage information table and the object element linkage information table used in FIG. 6.

In the embodiment of FIG. 6, the image data and the voice data are independently read separately from the recorded information of the VTR. Therefore, it is necessary to store the related linkage information data in the table. As shown in FIGS. 2 and 3, the object linkage information table in the embodiment of FIG. 1 contains the video tape ID 117, the program ID 118, the history information ID 119 and the object element linkage information table ID 124, and the object element information table contains the point marker 127, the line number 128 of the program source text and the line number 129 of the history information. In the embodiment of FIG. 6, on the other hand, the object linkage information table contains, in addition to the above data, an image data ID 120, a voice data ID 121, a video tape ID (for animation) 122 and a video tape ID (for peripheral) 123, and as shown in FIG. 7(b), the object element linkage information table additionally contains image data (area) 130, a point marker (voice) 131, a point marker (animation) 132 and a point marker (peripheral) 133.

The operation of the embodiment of FIG. 6 is now explained.

The program registered in the program file 4 is executed by the program execution block 8 and the linkage information table is set and recorded as it is in the embodiment of FIG. 1. When the user instructs to the program execution block 8 to interrupt the execution, it interrupts the execution of the program and pauses the recording of the image. At the interruption, the user inputs the data to be linked to the interrupted image into the computer by the voice recorder 110, the image scanner 111 and the editor 114, and the name of the file in which the data is stored and the data area (location) information are stored in the linkage information table correlatively to the interrupted image. When the linking process is completed and the user provides instructions to resume the execution, the program execution unit 8 resumes the execution of the program and also resumes the recording of the image. The above process is repeated until the execution of the program is terminated.

When the recorded image is to be replayed, the linkage information set/read block 10 reads the value of the point marker recorded in the replayed image, refers the linkage information table, and when the data designated by the user is detected, the replaying of the recorded image is paused, and the source text of the program corresponding to the replayed image and the history information text, and the data which the user has registered are displayed in the multi-window screen by the linkage information display block 11 and the voice/image data editor/replayer 115.

In the above method, the user who records the program execution images and correlates the data thereto and the user who replays the recorded images and watches the linkage information of the desired image may be different. Consequently, the information related to the program execution image can be conveyed through the execution image to a person who was not present when the image was recorded. For example, a user claim which was generated at the execution of the program may be immediately registered correlatively to the execution image so that the program developer who is not on site can understand what user claim was generated at what point.

In a fourth embodiment of the present invention, the program execution status represented by animation is linked by FIGS. 6 and 7.

Graphic representation methods of the program includes a PAD (problem analysis diagram) and a state transition diagram. The graphs in the PAD change the colors as the program is executed or the state diagrams in the state transition diagram change the colors as the program is executed so that the execution status of the program is represented by the animation. The animation execution images are recorded by the system shown in FIG. 6 in the same manner as that for the program execution images.

A difference from the program execution image of FIG. 1 resides in that a different point marker value is set for each image of the animation execution recorded images, a value is set for the item 132 of the object element linkage information table of FIG. 7(b), and values are set for the execution line number 128 of the program source text corresponding to the image, the history text line number 129 and the point marker 127 of the program execution image.

When the recorded image is to be replayed, the values of the tape marker and the point marker recorded in the program execution image are read by the linkage information set/read block 10 of FIG. 6 and the related animation execution image (including the execution images before and after that execution image) is replayed based on the linkage information table, or the animation execution image may be replayed in synchronism with the program execution image.

On the other hand, the related program execution image, program source text, execution history information, image data or voice data may be accessed based on the animation execution image or the linkage information table.

Figure 8:
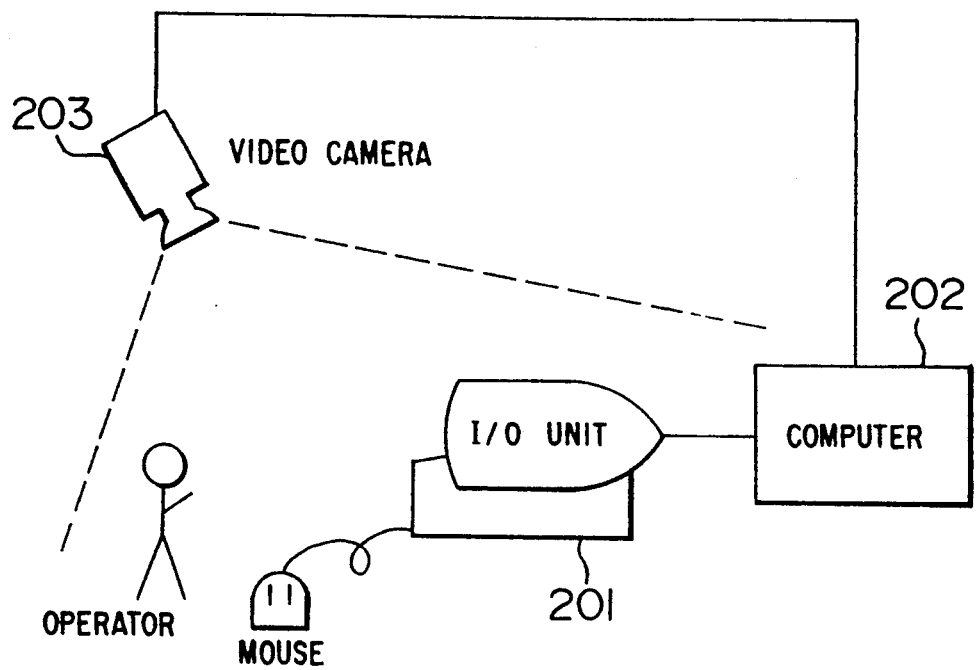
FIGS. 8, 9 and 10 show layouts for displaying program execution status in a fifth embodiment of the present invention.
Figure 9:
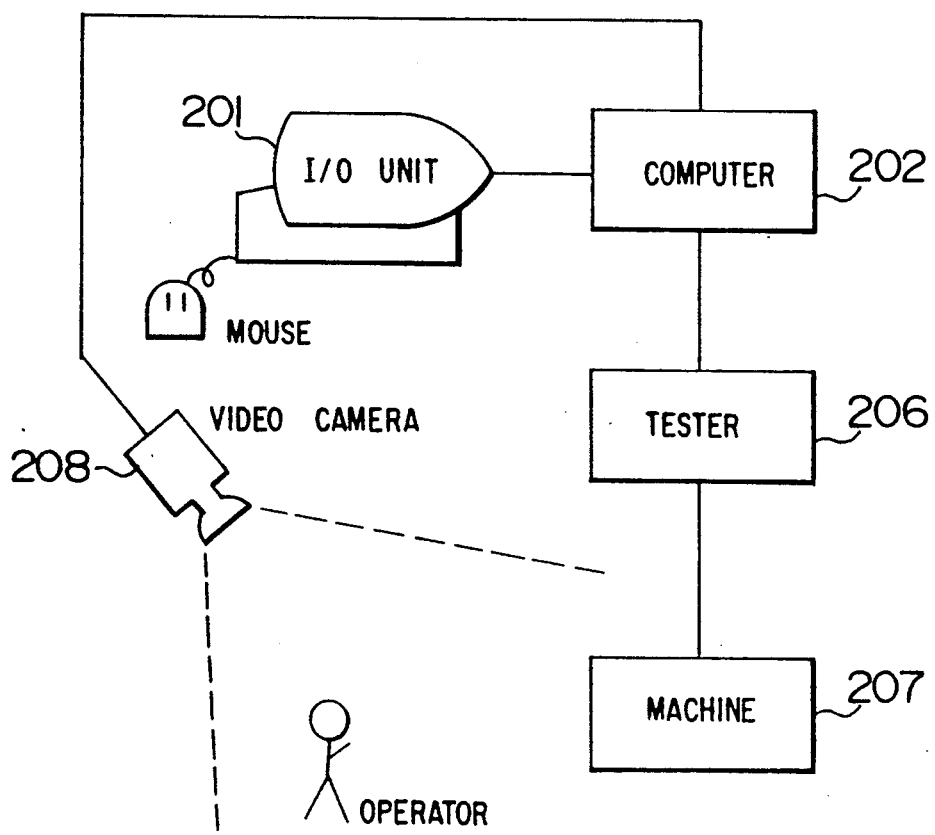
Figure 10:
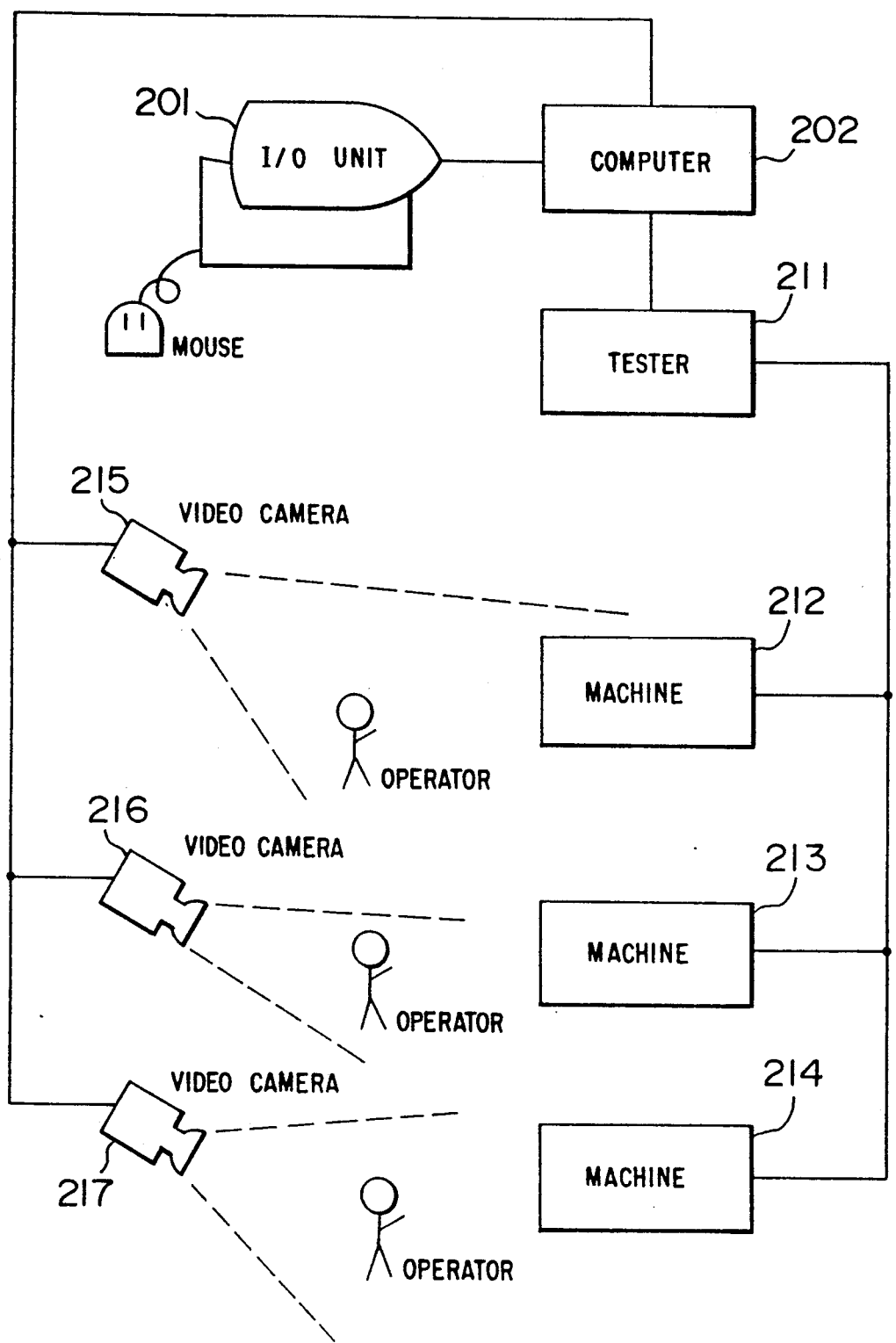

FIGS. 8, 9 and 10 show layouts of a computer system in accordance with a fifth embodiment of the present invention.

In the present embodiment, the program execution image is not recorded but a video camera is arranged around a machine (computer) which the program controls to record the machine itself or the movement of the surrounding people and articles.

In FIG. 8, a video camera 203 is arranged around a computer 202 which executes the program to record the operations and movement of the computer 202 and the input/output device 201 connected thereto including a keyboard, a display and a mouse and the operator.

In FIG. 9, the program controls a machine 207, and a video camera 208 is arranged around the machine 207 to record the operation and movement of the machine and the operator.

In the actual operation, the program is loaded in the machine 207. In a test/maintenance mode, the program is executed in the computer 202 in an interpreter method so that a test equipment 206 controls the machine 207 by an execution control signal of the computer 202 in a manner as if the program is loaded. The interpreter method is an interpreter execution method which interpretes and executes instructions line by line as distinguished from a compile execution method.

In FIG. 10, a plurality of distributed machines 212, 213 and 214 are controlled by the program, and a plurality of video cameras 215, 216 and 217 are arranged around the machines to record the operations and movement of the machines 212, 213 and 214 and the operators.

In the object linkage information table shown in FIG. 7(a), only one item, the video tape ID (peripheral) 123 is included, and in the object element linkage information table shown in FIG. 7(b), only one item, the point marker (peripheral) 133 is included. In FIG. 10, the items in the linkage information tables are added one set for each additional video camera.

The recording in the fifth embodiment may be implemented in the same manner as that of the fourth embodiment (FIG. 6). Namely, a different point marker value is set for each recorded image around the computer and a value is set for the item 133 of the object element linkage information table of FIG. 7(b). The values of the execution line number (128 in FIG. 7(b)) of the source text of the program, the line number (129 in FIG. 7(b)) of the history text and the point marker (127 in FIG. 7(b)) of the program execution image are set.

When the recorded image is to be replayed, the values of the tape marker and the point marker recorded in the recorded image around the computer are read by the linkage information set/read block 10 of FIG. 6 so that the related program execution image, program source text, execution history information, image data and voice data may be accessed based on the linkage information table.

In accordance with the present invention, (A) the program execution status is recorded by the image recorder or the voice recorder and it is replayed so that the information related to the execution status or the related portion of the program may be automatically presented to the user while the user refers the program execution status. Accordingly, the modification portion of the program corresponding to the execution status can be readily detected. Further, (B) since the operation images of the existing program as well as the moving image of the machine controlled by the program and the peripheral articles and operators are presented, the functions and features of the program can be rapidly conveyed to the user.

In addition, (C) by registering the data designated by the user (test information of claims) correlatively to the recorded image during the execution of the program, the data which the user has registered can be presented to other persons through the reproduced image of the program execution, the text information such as the execution history information related to the program execution image, the image data, the voice data or the graphic representation (animation) data of the program execution status can be correlatively displayed. As a result, the environment of development, maintenance and test of the software is improved and the productivity of the software is improved.

Further, (D) instead of executing the program, the software in the fourth generation language or the executable program specification may be executed, the voice information and the image information of the execution status and the execution history information are correlatively recorded, and the information may be replayed.

I claim:

1. A method for linking program execution status information by correlatively linking text data of a program, execution history information generated in eh course of execution of the program and image information related to the execution of the program, the method comprising steps of:
- (A) storing the test data of the program including a plurality of instruction statements executed sequentially by line number;
- (B) storing the image information which is continuously obtained by recording at least one of a moving image of a machine controlled by the program and an operation image of an operator produced as the program is executed, together with recorded image data identification numbers determined in accordance with a predetermined rule;
- (C) storing execution history information inputted by an operator or generated in the course of the execution of the program, together with history numbers assigned in a predetermined sequence; and
- (D) correlatively storing in a table the recorded image data identification numbers, line numbers of the program corresponding to the recorded image information having the recorded image data identification numbers assigned thereto and the history numbers assigned to the execution history information corresponding to the programs designated by the line numbers.

2. The method for linking program execution status information according to claim 1, further comprising the steps of:
- (E) searching the table to display at least one of the text data of the program corresponding to the recorded image information stopped by an operator's instruction during replaying of the recorded image information, and the execution history information; and
- (F) parallelly displaying at least one of the recorded image information and the text data of the program corresponding to the line number of the program determined by searching the table, and the execution history information corresponding to the history number.

3. The method for linking program execution status information according to claim 1, further comprising the steps of:
- (E) searching the table to display the text data corresponding to one of the line number and history number designated by one of the operator in the text data of the program and the execution history information displayed on the display screen; and
- (F) displaying the recorded image information having the image data identification number assigned thereto by searching the table.

* * * * *

UNITED STATES PATENT AND TRADEMARK OFFICE
CERTIFICATE OF CORRECTION

PATENT NO. : 5,315,697
DATED : May 24, 1994
INVENTOR(S) : Yuji Nagamatsu

It is certified that error appears in the above-indentified patent and that said Letters Patent is hereby corrected as shown below:

Claim 1, column 11, line 1, delete "eh" and substitute therefor --the--.

Signed and Sealed this

Sixteenth Day of August, 1994

Attest:

BRUCE LEHMAN

Attesting Officer

Commissioner of Patents and Trademarks